United States Patent
McDowall et al.

(10) Patent No.: US 10,451,904 B2
(45) Date of Patent: *Oct. 22, 2019

(54) ELECTRICALLY CONTROLLED OPTICAL ELEMENTS AND METHOD

(71) Applicant: Fakespace Labs, Inc., Mountain View, CA (US)

(72) Inventors: Ian E. McDowall, Mountain View, CA (US); Mark T. Bolas, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,755

(22) Filed: Mar. 10, 2017

(65) Prior Publication Data

US 2017/0242278 A1    Aug. 24, 2017

Related U.S. Application Data

(63) Continuation of application No. 14/979,940, filed on Dec. 28, 2015, now Pat. No. 9,594,263, which is a
(Continued)

(51) Int. Cl.
| | | |
|---|---|---|
| *G02F 1/01* | (2006.01) | |
| *G02B 5/30* | (2006.01) | |
| *G02B 27/28* | (2006.01) | |
| *G02F 1/29* | (2006.01) | |
| *G03B 13/02* | (2006.01) | |
| *G02B 27/14* | (2006.01) | |
| *G02B 27/40* | (2006.01) | |

(Continued)

(52) U.S. Cl.
CPC ............. *G02F 1/0136* (2013.01); *G02B 5/30* (2013.01); *G02B 5/3083* (2013.01); *G02B 27/144* (2013.01); *G02B 27/283* (2013.01); *G02B 27/286* (2013.01); *G02B 27/40* (2013.01); *G02F 1/09* (2013.01); *G02F 1/29* (2013.01); *G03B 13/02* (2013.01); *G02B 15/00* (2013.01); *G02B 15/14* (2013.01); *G02B 27/141* (2013.01); *G02B 27/28* (2013.01); *G02F 2001/294* (2013.01); *G02F 2203/07* (2013.01)

(58) Field of Classification Search
CPC .... G02F 1/0136; G02F 1/29; G02F 2001/294; G02F 2203/07; G02F 1/09; G03B 13/02; G03B 13/32; G03B 13/34; G03B 13/36; G02B 5/00; G02B 5/30; G02B 5/3025; G02B 5/3083; G02B 27/14; G02B 27/141; G02B 27/144; G02B 27/283; G02B 27/286; G02B 27/40; G02B 5/3016; G02B 15/00; G02B 15/14; G02B 27/28
USPC ....... 359/247, 301, 303, 304, 315, 318, 320, 359/483.01, 484.01, 485.01, 485.07, 359/485.05, 631, 633, 643, 645; 372/26, 372/33, 105, 106; 385/18; 345/690, 156; 362/19, 292, 559; 353/20, 69, 98
See application file for complete search history.

(56) References Cited

U.S. PATENT DOCUMENTS

| | | | | |
|---|---|---|---|---|
| 6,271,969 B1 * | 8/2001 | Mertz | ................ | G02B 27/0172 359/489.07 |
| 6,710,928 B2 * | 3/2004 | Roest | ................. | G02B 27/0172 359/631 |
| 2016/0077351 A1 * | 3/2016 | Iwane | .................... | G03B 35/24 349/15 |

* cited by examiner

*Primary Examiner* — Bumsuk Won
(74) *Attorney, Agent, or Firm* — K. David Crockett, Esq.; Paul J. Backofen, Esq.; Crockett & Crockett, PC

(57) ABSTRACT

The effective focal length of an optical system can be electronically controlled using switchable wave plates in conjunction with polarized light.

15 Claims, 5 Drawing Sheets

Related U.S. Application Data continuation of application No. 14/321,430, filed on Jul. 1, 2014, now Pat. No. 9,223,155, which is a continuation of application No. 13/221,758, filed on Aug. 30, 2011, now Pat. No. 8,767,284, which is a continuation of application No. 12/561,156, filed on Sep. 16, 2009, now Pat. No. 8,009,349, which is a continuation of application No. 11/086,188, filed on Mar. 21, 2005, now abandoned.

(60) Provisional application No. 60/554,870, filed on Mar. 22, 2004.

(51) Int. Cl.
    *G02F 1/09*     (2006.01)
    *G02B 15/14*     (2006.01)
    *G02B 15/00*     (2006.01)

ELECTRICALLY CONTROLLED OPTICAL ELEMENTS AND METHOD

RELATED APPLICATIONS

This application is a continuation of U.S. application Ser. No. 14/979,940, filed Dec. 28, 2015, now U.S. Pat. No. 9,594,263, which is a continuation of U.S. application Ser. No. 14/321,430, filed Jul. 1, 2014, now U.S. Pat. No. 9,223,155, which is a continuation of U.S. application Ser. No. 13/221,758, filed Aug. 30, 2011, now U.S. Pat. No. 8,767,284, which is a continuation of U.S. application Ser. No. 12/561,156, filed Sep. 16, 2009, now U.S. Pat. No. 8,009,349, which is a continuation of U.S. application Ser. No. 11/086,188, filed Mar. 21, 2005, now abandoned, which claims priority to U.S. Provisional Application 60/554,870, filed Mar. 22, 2004.

BACKGROUND

It is desirable in many optical systems to be able to dynamically change the focal length of or effective airspaces in an optical layout. For example, in a camera, it is often advantageous to have a zoom lens that is capable of altering its focal length in order to change the magnification of an image. In other optical systems, such as viewfinders for near-to-eye virtual reality displays, it is beneficial to have a viewfinder that can quickly switch from creating a wide-angle, immersive image to displaying a narrow angle, high resolution image. Implementation of zoom, angle adjustment, and other focal-length dependent dynamic optical alterations typically require mechanical adjustment—an element or optics group is moved in relation to others and the overall focal length of the system is adjusted.

The mechanical adjustment of such systems requires the motion of an element and can thus be adjusted only as quickly as the elements can be moved. The mechanism for such adjustment requires some sort of motor if a computer is to control the adjustment. The attendant size of the adjustment mechanism can be difficult to incorporate into small cameras such as those in mobile telephones or virtual reality displays where weight is often an important factor. Mechanical adjusters are prone to breakage and must be kept clean in order to function well, necessitating the delicate treatment of zoom camera lenses, microscopes, and other equipment optical equipment with mechanically adjusted focal lengths.

Accordingly, it is desirable to provide electrically controlled optical elements and an associated method. The electrically controlled optical elements afford a method for altering an optical system's configuration without physically moving any of the optics, allowing a compact, durable, quickly adjustable optical package.

SUMMARY OF THE INVENTIONS

Electrically controlled optical elements manipulate the polarization of light in order to vary the effective focal length of an optical instrument. This invention utilizes an element, such as a switchable ferro-electric half wave plate mirror, that is capable of variably switching between the polarizations of light it passes through the optical assembly. When the switchable element passes light of one kind of polarization, the light travels through the optical elements normally. When the switchable element passes light of a different polarization, however, the light is reflected twice within the assembly, resulting in a longer effective focal length than before. By using polarization to control the path of light within the optical elements and folding the light path, it is possible to create a compact zoom lens or a near to eye display with multiple fields of view without any moving parts.

An electrically controlled optical system for controlling the focal length of an optical system on a light path includes a switchable wave plate having two or more states, the switchable wave plate receiving light input to the light path, and an electrical means for controlling the state of the switchable wave plate, a half-silvered mirror receiving light from the switchable wave plate, a polarization dependent mirror receiving light from the half-silvered mirror, and one or more optical elements.

DETAILED DESCRIPTION OF THE PREFERRED EMBODIMENTS

Figure 1:
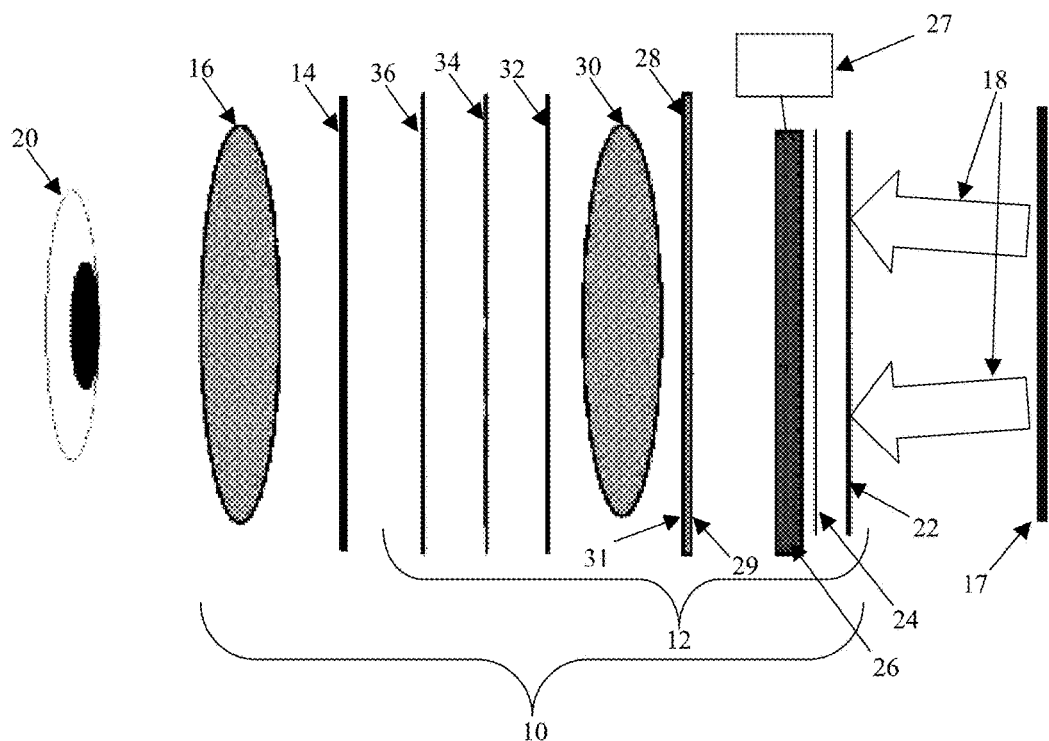
FIG. 1 schematically illustrates in side plan view an application of electrically controlled optical elements in accordance with an embodiment of the invention.
Figure 2:
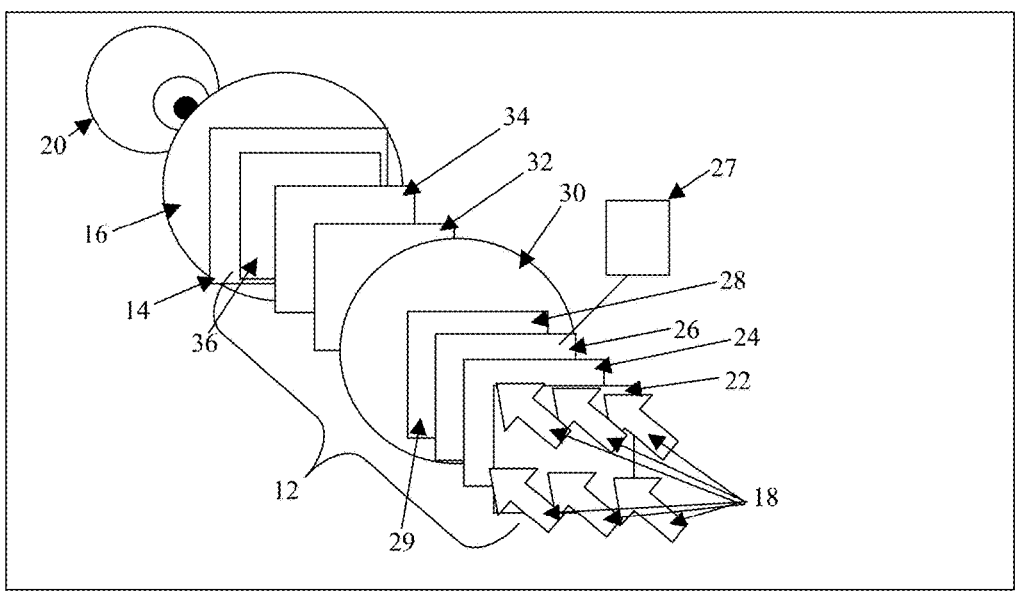
FIG. 2 schematically illustrates in perspective view an application of electrically controlled optical elements in accordance with an embodiment of the invention.

FIGS. 1 and 2 schematically illustrate electrically controlled optical elements as applied in a near-to-eye application, such as one found in a virtual reality head-mounted display or viewfinder. Viewfinder 10 consists of electrically controlled optical elements 12 as well as diffusion screen 14 and viewing optics 16. The components of viewfinder 10 are contained within an enclosure, such as an aluminum housing (not illustrated). As illustrated, light rays 18 exit a display, such as an LCD 17, enter viewfinder 10 from the right, and exit the viewfinder from the left into a viewer's eyeball 20.

Electrically controlled optical elements 12 consist of linear polarizer 22, quarter wave plate 24, ferro-electric switchable half wave plate 26, control electronics 27, half silvered mirror 28, lens 30, quarter wave plate 32, reflective polarizer 34, and linear polarizer 36. The elements of viewfinder 10 are positioned so that they are substantially parallel to one another. The distances shown in FIGS. 1 and 2 are purely for illustrative purposes; those of skill in the art will recognize that the individual components of the system could be separated by different distances illustrated in FIGS. 1 and 2 without departing from the spirit of the invention and optics 16 and 30 would be composed of one or more lenses and/or air spaces.

Linear polarizer 22 may be oriented as an "S" or a "P" linear polarizer; in this illustrative embodiment, polarizer 22 is an "S" polarizer and passes light with "S" polarization. Quarter wave plate 24 circularly polarizes the linearly polarized light that passes through linear polarizer 22. The linearly polarized light that transmits through linear polarizer 22 is thus circularly polarized with an "L" handedness.

Ferro-electric switchable half wave plate 26 may be, for example, a switchable half wave plate made by Displaytech or others. The ferro-electric switchable half wave plate is oriented to pass the circularly polarized light that exits quarter wave plate 24. The light transmitted can be controlled to be a left or right handed by switching the switchable wave plate. The wave plate and switchable element could be a single switchable plate with suitable switchable retardation performance, such that the handedness of the light's circular polarization, is controlled by the state of the electrical signals received from control electronics 27. For the purposes of illustration, if ferro-electric switchable half wave plate 26 is "on", it reverses the handedness of the light's polarization that passes through it, and if the ferro-electric switchable half wave plate is "off", it does not change the handedness of the light's circular polarization that passes through it. Note that the terms "on" and "off" as applied to the ferro-electric switchable half wave plate are generic terms, as switching between the "on" and "off" states on the ferro-electric switchable half wave plate may involve reversing a voltage applied to the ferro-electric switchable half wave plate or the like.

Those of skill in the art will recognize that ferro-electric switchable half wave plate may be replaced by an LCD or the like that can similarly perform the task of selectably altering the circular polarization of light without departing from the spirit of the invention, and that this could be done in an array, not just in a single large shutter.

Control electronics 27 are configured to electrically govern whether ferro-electric switchable half waveplate is in an "on" or "off" state by applying signals to the ferro-electric switchable half wave plate. The control electronics may include, for example, a microchip, a central processing unit, or the like. Signals to the ferro-electric switchable half wave plate may include an applied voltage, an alternating current, or the like.

Half silvered mirror 28 is designed to reflect a percentage of light that passes through ferro-electric switchable half wave plate 26 and transmit the remainder of the light. The percentage of light that the half silvered mirror reflects versus transmits may be tailored to meet particular design specifications by altering the coatings on the half silvered mirror or the like. For the purposes of illustration, half silvered mirror 28 is designed to reflect fifty percent of the light that passes through ferro-electric switchable half wave plate 26 and transmit the other fifty percent of the light. Surface 29 and/or surface 31 maybe coated in order to reflect fifty percent of the light and transmit fifty percent of the light (losses would alter this a bit).

Lens 30 is a lens and refracts the light transmitted through half silvered mirror 28. In the preferred embodiment of the invention lens 30 is a glass lens that does not affect the polarization of the light that passes through it. While the illustrated lens in FIGS. 1 and 2 is a circular, double-convex lens, those of skill in the art will recognize that other possible lens types, such as a fresnel lens, a lens group, or the like, also find application in the present invention.

Quarter wave plate 32 linearly polarizes the circularly polarized light that passes through lens 30. Thus, light that is circularly polarized with an "L" handedness becomes "S" linearly polarized and light that is circularly polarized with an "R" handedness becomes "P" linearly polarized when passing through quarter wave plate 32.

Reflective polarizer 34 reflects linear polarization of one type and transmits the linear polarization of the other type. Reflective polarizer 34 may be oriented as either an "S" or a "P" polarizer, however, as configured in the illustrated embodiments, reflective polarizer 34 reflects linear polarizations of the same type that linear polarizer 22 passes. Thus, for the purposes of illustration, reflective polarizer 34 is a "P" polarizer that reflects "S" polarized light and transmits "P" polarized light. Those of skill in the art will recognize that quarter wave plate 32 and reflective polarizer 34 need not be separate elements but may be made integrally, either by bonding the two together or manufacturing them together as one element, without departing from the spirit of the invention.

Linear polarizer 36 may be oriented as either an "S" or a "P" polarizer. Those of skill in the art will recognize that it is possible to build the present invention without linear polarizer 36; however, in the preferred embodiment of the invention linear polarizer 36 is included.

Diffuser 14 of viewfinder 10 acts as a diffusion screen on to which images from the display are projected by electrically controlled optical elements 12. The angles at which diffuser 14 disperses light may be selected depending on the optical requirements of the system. Those of skill in the art will recognize that it is possible to build a viewfinder without diffuser 14 without departing from the spirit of the invention.

Lens 16 is a lens and refracts the light that passes through diffuser 14 and focuses the light rays for eyeball 20. While the illustrated lens in FIGS. 1 and 2 is a circular, double-convex lens, those of skill in the art will recognize that other possible lens types, such as a fresnel lens, a lens group, or the like, also find application in the present invention.

In an additional embodiment of the invention (not illustrated), lens 30 is removed from electrically controlled optical elements 12 and only air occupies the space between half silvered mirror 28 and quarter wave plate 32. Certain applications, like inexpensive zoom lenses, may not require the additional expense of a lens or may necessitate the removal of the lens due to packaging concerns. Those of skill in the art will recognize that it is possible to fill the volume of space between the half silvered mirror and the quarter wave plate with a material that possesses an index of refraction different than air, such as water, without departing from the spirit of the invention.

In an additional embodiment of the invention (not illustrated), quarter wave plate 32 is located between lens 30 and half silvered mirror 28. It may also be bonded to the half silvered mirror to make the two a single, integral element.

In an additional embodiment of the invention (not illustrated), ferro-electric switchable half wave plate 26 and quarter wave plate 24 are combined into a single electro-optic shutter.

In an additional embodiment of the invention (not illustrated), a ferro-electric switchable quarter wave plate is used in combination with a static half wave plate in place of quarter wave plate 24 and ferro-electric switchable half wave plate 26. Alternatively, wave plates 24 and 26 could be a single electro-optical element.

Figure 3:
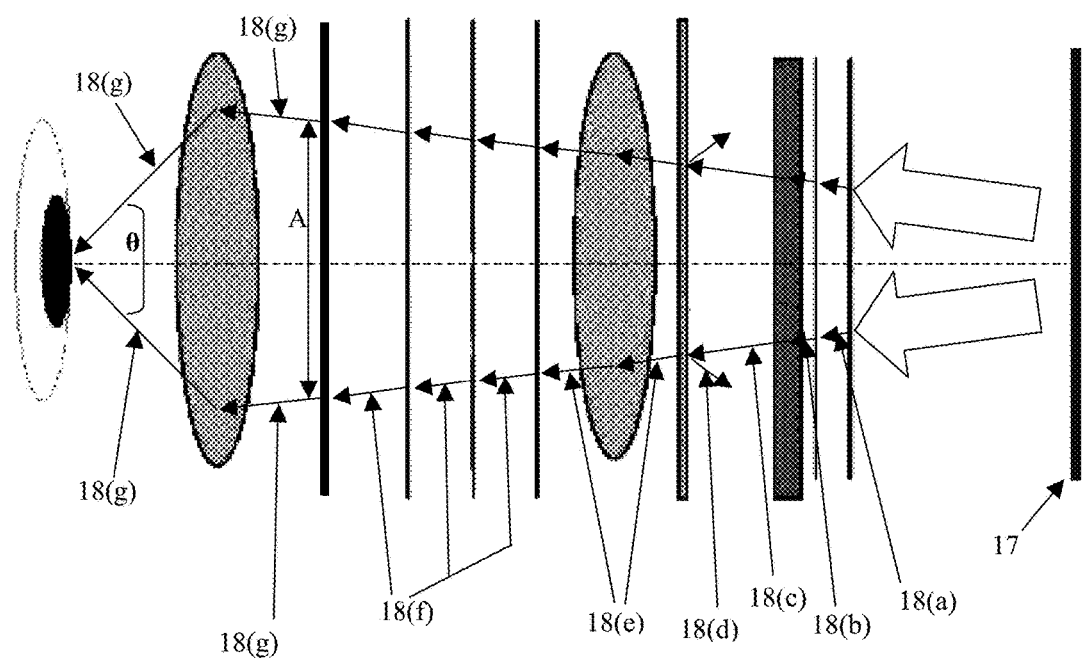
FIG. 3 schematically illustrates in plan view the operation of electrically controlled optical elements in accordance with an embodiment of the invention.

Illustrative Operation of Viewfinder Utilizing Electrically Controlled Optical Elements FIG. 3 shows in plan view the operation of viewfinder 10 with ferro-electric switchable half wave plate "on". With continuing reference to FIGS. 1 and 2, unpolarized light rays 18 exit the display 17 and enter viewfinder 10. Light rays 18 pass through linear filter 22 and become "S" polarized (as represented by light rays 18(a)) before passing through quarter wave plate 24 where the "S" polarized light rays become circularly polarized with an "L" handedness. Light rays 18(b) then transmit through ferro-electric switchable half wave plate 26. Because the ferro-electric switchable half wave plate is turned "on" by control electronics 27, the handedness of the circular polarization the light rays is reversed so that light rays 18(c) exiting ferro-electric switchable half wave plate have an "R" handedness. Next, "R" circularly polarized light rays 18(c) transmit to half silvered mirror 28 where half the light rays (light rays 18(d)) reflect off the half silvered mirror and half the light rays (light rays 18(e)) transmit through the half silvered mirror. Light rays 18(e) enter lens 30, which refracts the light rays on to quarter wave plate 32. When light rays 18(f) exit the quarter wave plate, their polarization state has been switched from circular "R" to linear "P". Light rays 18(f) next intersect reflective polarizer 34. Because light rays 18(f) are "P" polarized and reflective polarizer 34 is a "P" polarizer, the light rays pass through the reflective polarizer unchanged before passing through linear polarizer 36, which also does not change the light rays' polarization. Light rays 18(f) form an image on diffuser 14; this image has a height A (for example, 4 inches). Lens 16 collects light rays 18(g) and focuses them on eyeball 20. Based on the distance B between eyeball 20 and lens 16 (for example, one inch), the focal length of lens 16, and the height A of the image formed by diffuser 14, viewfinder 10 in the present configuration has a viewing angle θ.

Figure 4:
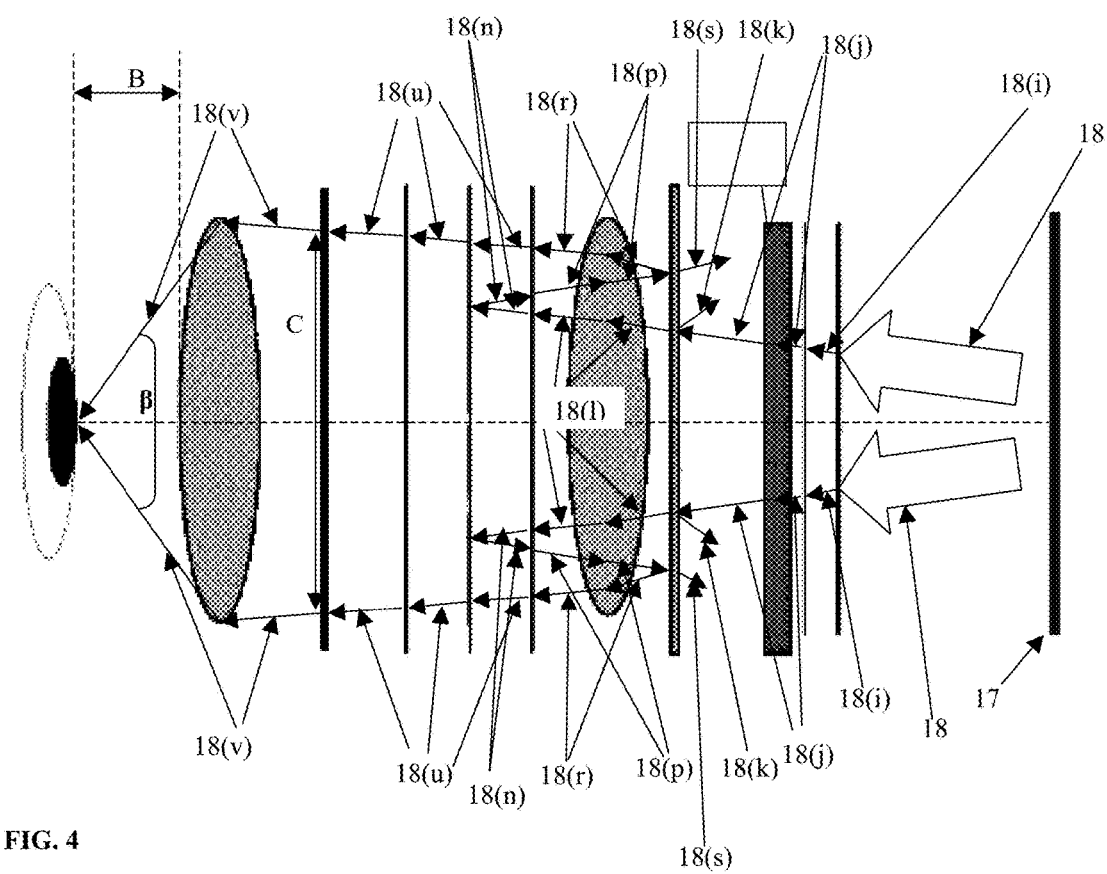
FIG. 4 schematically illustrates in plan view the operation of electrically controlled optical elements in accordance with an embodiment of the invention.

FIG. 4 shows in plan view the operation of viewfinder 10 with ferro electric switchable half wave plate "off". With continuing reference to FIGS. 1 and 2, unpolarized light rays 18 exit the display (not illustrated) and enter viewfinder 10. Light rays 18 pass through linear filter 22 and become "S" polarized (as represented by light rays 18(i)) before passing through quarter wave plate 24 where the "S" polarized light rays are circularly polarized with an "L" handedness. Light rays 18(j) then transmit through ferro-electric switchable half wave plate 26. Because the ferro-electric switchable half wave plate is "off", the "L" handedness of the circular polarization of light rays 18(j) remains unchanged. Next, light rays 18(j) transmit to half silvered mirror 28 where half the light rays (light rays 18(k)) reflect off the half silvered mirror and half the light rays (light rays 18(l)) transmit through the half silvered mirror. Light rays 18(l) enter lens 30, which refracts the light rays on to quarter wave plate 32. The quarter wave plate changes the polarization state of the light rays from circular "L" to linear "S", so light rays 18(n) that exit the quarter wave plate are "S" polarized. Light rays 18(n) next intersect reflective polarizer 34. Because light rays 18(n) are "S" polarized and reflective polarizer 34 is a "P" polarizer, light rays 18(n) do not transmit through the reflective polarizer but rather reflect off it. The light rays are still "S" polarized. Light rays 18(n) pass through quarter wave plate 32 again and light rays 18(p) that exit the quarter wave plate have circular polarization with "L" handedness. Lens 30 collects light rays 18(p) and refracts the light rays on to half silvered mirror 28. Half of light rays 18(p) reflect off half silvered mirror 28 (light rays 18(r)) and half the light rays transmit through the half silvered mirror (light rays 18(s)). Reflecting off half silvered mirror 28 causes the handedness of the light rays' circular polarization to reverse; light rays 18(r) now are circularly polarized with an "R" handedness. Lens 30 collects light rays 18(r) and refracts the light rays on to quarter wave plate 32. The quarter wave plate changes the polarization of the light rays from circular "R" to linear "P". Light rays 18(u) next intersect reflective polarizer 34. Because light rays 18(u) are now "P" polarized and reflective polarizer 34 is a "P" polarizer, the light rays pass through the reflective polarizer unchanged before passing through linear polarizer 36, which also does not change the light rays' polarization. Light rays 18(u) form an image on diffuser 14; this image has a height C (for example, 7 inches). Lens 16 collects light rays 18(v) and focuses them on eyeball 20. Based on the distance B between eyeball 20 and lens 16 (for example, one inch), the focal length of lens 16, and the height C of the image formed by diffuser 14, viewfinder 10 in the present configuration has a viewing angle β.

As it is configured in FIGS. 1-4, the electrically controlled optical elements in viewfinder 10 produce a larger image, and thus a more highly magnified image, when the ferro-electric switchable half wave plate is turned "off". The viewing angle, β, when the ferro-electric switchable half wave plate is "off" is also larger than the viewing angle, θ, when the ferro-electric switchable half wave plate is "on". Note that the effective focal length of the electrically controlled optical elements increases when the ferro-electric switchable half wave plate is "on" because light rays must traverse the distance between the reflective polarizer and the half silvered mirror three times instead of just once. The image projected by the electrically controlled optical elements is only half as bright when the ferro-electric switchable half wave plate is "off" versus "on", however, because light rays encounter the half silvered mirror twice when the ferro-electric switchable half wave plate is "off" instead of just once when it is "on".

It is easy to appreciate how it is possible to stack together several individual electrically controlled optical elements to create an optical device with multiple possible effective focal lengths and viewing angles. The ferro-electric switchable half wave plate in each electrically controlled optical element stack can be individually turned "on" and "off"; therefore, an effective focal length for the design can range from a short distance, when all the ferro-electric switchable half wave plates are "on", to a long distance, when the ferro-electric switchable half wave plates are "off." In-between effective focal lengths are possible by turning some of the ferro-electric switchable half wave plates "on" and some "off". The distance between the half silvered mirror and the reflective polarizer could be tailored in each electrically controlled optical element stack in order to meet design criteria. The polarizers in each individual electrically controlled optical stack must be designed to transmit the polarized light that exits the previous electrically controlled optical element stack.

Those of skill in the art will recognize that it is possible to fabricate electrically controlled optical elements that project a smaller image or create an image with a smaller field of view when the ferro-electric switchable half wave plate is "on" without departing from the spirit of the invention. This can be done, for example, by replacing lens 30 with a diverging lens. The rest of the components of such a system would operate in the same manner as described in the preceding paragraphs.

Application To Zoom Lenses

Figure 5A:
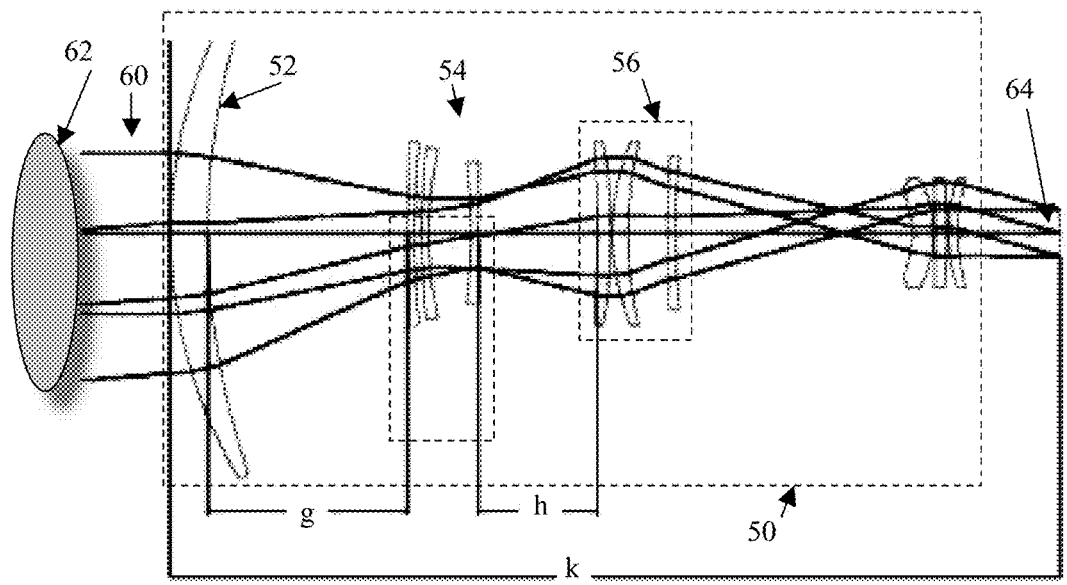
FIGS. 5a and 5b schematically illustrate in cross sectional views a prior art zoom lens in a first and second zoom state, respectively.
Figure 5B:
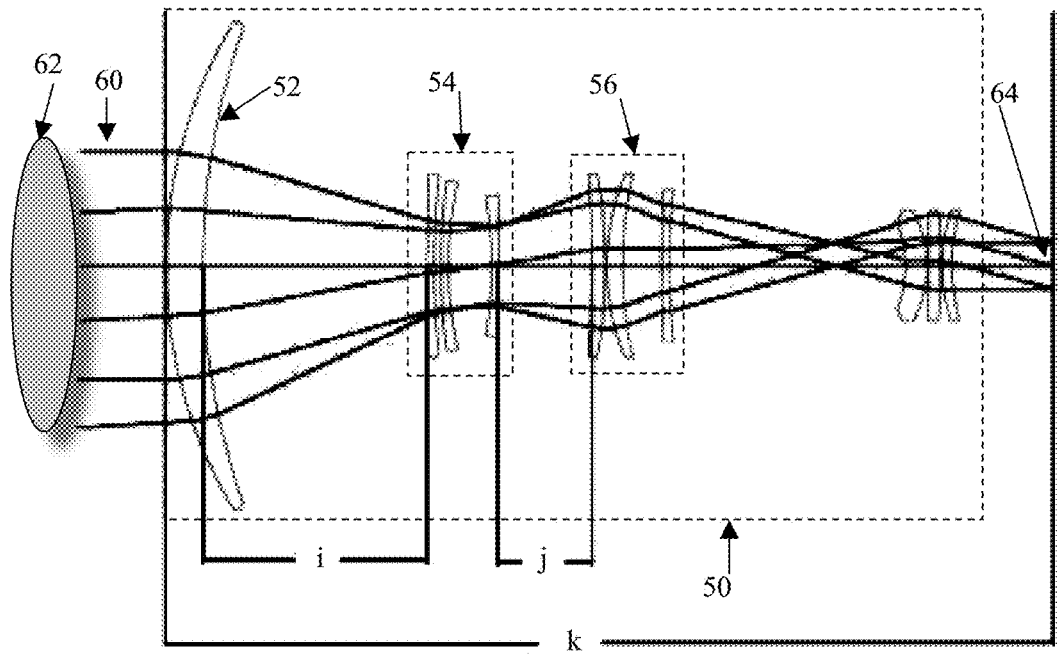

It is also advantageous to use electrically controlled optical elements in applications such as zoom lenses. FIGS. 5a and 5b schematically illustrate in cross sectional view the optical elements of a prior art zoom lens in a first and second zoom state, respectively. The operation of zoom lens 50 is familiar to those of skill in the art. In FIGS. 5a and 5b, light rays 60 from an object 62 are focused by the zoom lens on to an internal surface 64. Surface 64 may be, for example, the surface of a charge coupled device, light sensitive film, or the like. In order to change the magnification of the image of object 62 on surface 64, the effective focal length of the lens is changed. This is executed by moving lens group 54 relative to lens 52 and lens group 56. A first zoom state is illustrated in FIG. 5a, with lens group 54 is located a distance g from lens 52 (for example, 2.6 inches) and a distance h from lens group 56 (for example, 1.5 inches), resulting in an effective focal length of, for example, two inches. A second zoom state is illustrated in FIG. 5b; lens group 54 is moved to a distance i from lens 52 (for example, 2.9 inches) and a distance j from lens 56 (for example, 1.2 inches) resulting in an effective focal length of, for example, 5.9 inches. In typical zoom lenses, the manipulation of lens group 54 is performed using mechanical adjusters or a motor. These adjusters take up space, which is often undesirable. Also, while the overall length of zoom lens 50, represented by distance k (for example, 12.5 inches), does not change when moving lens group 54, in many zoom lenses the overall length does not remain fixed while altering the lens' focal length. This can be problematic if a static overall lens length is desired.

Figure 6A:
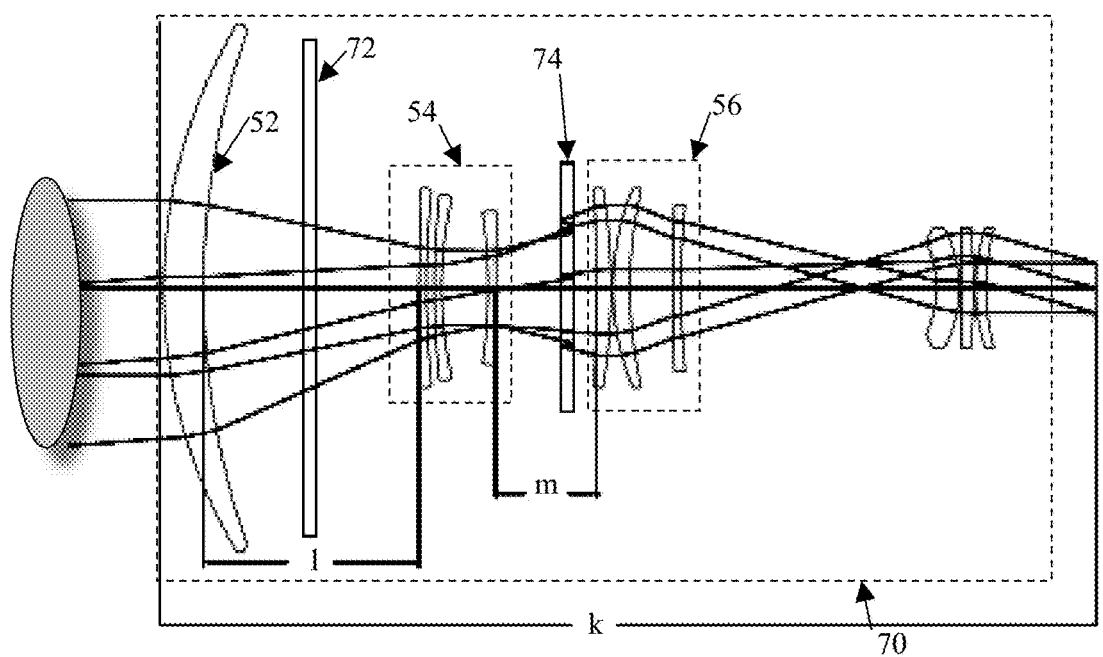
FIGS. 6a and 6b schematically illustrate in cross sectional views a zoom lens that employs electrically controlled optical elements in a first and second zoom state, respectively.
Figure 6B:
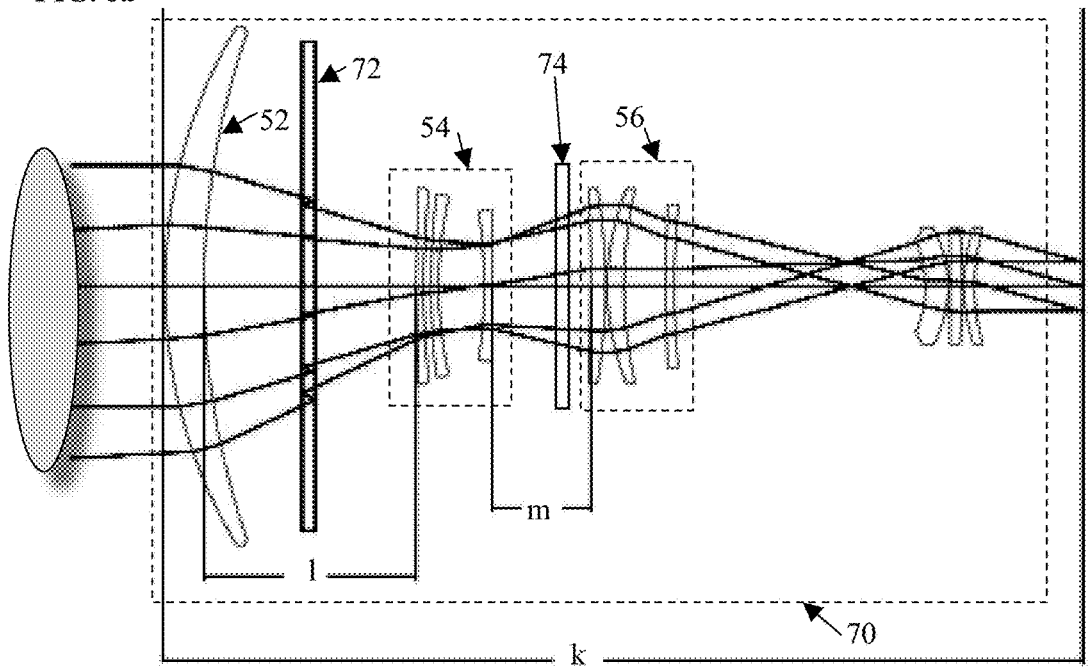

Alternately, electrically controlled optical elements may be used instead of mechanical adjusters to alter the effective distances between the lenses and lens groups. FIGS. 6a and 6b schematically illustrate in cross sectional view a zoom lens that employs electrically controlled optical elements in a first and second zoom state, respectively. The optical elements of zoom lens 70 remain unchanged from zoom lens 50 except for the addition of electrically controlled optical element groups 72 and 74. Electrically controlled optical element group 72 is located between lens 52 and lens group 54, and electrically controlled optical element group 74 is located between lens group 54 and lens group 56. Lens 52 and lens group 54 are physically separated by distance 1 (for example, 2.6 inches), and lens group 54 and lens group 56 are physically separated by distance m (for example, 1.2 inches). The length of the lens 70 stays the same constant distance k (for example, 12.5 inches). Unlike with zoom lens 50, these physical distances do not change as the focal length of lens 70 changes. In this particular example, the ferro-electric switchable half wave plates always operate in opposite states; i.e., the ferro-electric switchable half wave plate in electrically controlled optical element group 72 is on when the ferro-electric switchable half wave plate in electrically controlled optical element group 74 is off, and vice versa. A first zoom state is illustrated in FIG. 6a; the ferro-electric switchable half wave plate in electrically controlled optical element group 72 is "on", while the ferro-electric switchable half wave plate in electrically controlled optical elements 74 is "off." Therefore, the light path between lens 52 and lens group 54 is unaffected, and light traveling from lens 52 to lens group 54 must travel a distance 1. The light traveling between lens group 54 and lens group 56 travels three times between the half silvered mirror and the reflective polarizer in electrically controlled optical element group 74. This results in an effective light path length that is longer than distance m (for example, the effective light path length between lens group 54 and lens group 56 may be 1.5 inches). The second zoom state is illustrated in FIG. 6b; the ferro-electric switchable half wave plate in electrically controlled optical element group 72 is "off", while the ferro-electric switchable half wave plate in electrically controlled optical elements 74 is "on." The light traveling between lens 52 and lens group 54 travels three times between the half silvered mirror and the reflective polarizer in electrically controlled optical element group 72. This results in an effective light path length that is longer than distance 1 (for example, the effective light path length between lens 52 and lens group 54 may be 2.9 inches). The light path between lens group 54 and lens group 56 is unaffected, and light traveling from lens group 54 to lens group 56 must travel a distance m.

Those of skill in the art will recognize that it is possible to use more or less electrically controlled optical element groups in a zoom lens to achieve a similar result without departing from the spirit of the invention. Those of skill in the art will recognize that different configurations also exist, such as ones that do not require each electrically controlled optical element group to operate in opposite states.

While the foregoing invention is described for use in applications such as viewfinders and zoom lenses, the invention finds relevance without limitation in a wide range of applications. Electrically controlled optical elements may be used, for example, to create diffuser elements with variable diffuser angles, variable-magnification compact microscopes, and the like.

We claim:

1. An optical system for controlling a focal length optical layout in a light path between a lens and a display in a head mounted display comprising:
   a quarter wave plate in the light path between the lens and the display;
   a mirror in the light path between the quarter wave plate and the display;
   a wave plate in the light path between the mirror and the display, the wave plate having two or more states;
   electrical means for controlling the state of the wave plate operably connected to the wave plate;
   an airspace adjacent to the wave plate; and
   a polarization dependent mirror in the light path between the wave plate and the lens.

2. The optical system of claim 1, wherein the airspace is located between the wave plate and the polarization dependent mirror.

3. The optical system of claim 2, further comprising:
   a polarizer in the light path between the polarization dependent mirror and the display.

4. The optical system of claim 1, further comprising:
   a polarizer in the light path between the polarization dependent mirror and the display.

5. The optical system of claim 1, wherein the airspace is located between the mirror and the wave plate.

6. An optical system for controlling a light path between a lens and a display in a near-to-eye display comprising:
   a quarter wave plate in the light path between the lens and the display;
   a mirror in the light path between the quarter wave plate and the display;
   a wave plate having two or more states, the wave plate in the light path between the mirror and the display;
   electrical means for controlling the state of the wave plate operably connected to the wave plate;
   an airspace adjacent to the wave plate; and
   a polarization dependent mirror in the light path between the wave plate and the lens.

7. The optical system of claim 6, wherein the airspace is located between the wave plate and the polarization dependent mirror.

8. The optical system of claim 7, further comprising:
a polarizer in the light path between the polarization dependent mirror and the display.

9. The optical system of claim 6, further comprising:
a polarizer in the light path between the polarization dependent mirror and the display.

10. The optical system of claim 6, wherein the airspace is located between the mirror and the wave plate.

11. An optical system for controlling a focal length of an optical assembly in a light path between a lens and a display comprising:
a quarter wave plate in the light path between the lens and the display;
a mirror in the light path between the quarter wave plate and the display;
a wave plate having two or more states, the wave plate in the light path between the mirror and the display;
electrical means for controlling the state of the wave plate operably connected to the wave plate;
an airspace adjacent to the wave plate; and
a polarization dependent mirror in the light path between the wave plate and the lens.

12. The optical system of claim 11, wherein the airspace is located between the wave plate and the polarization dependent mirror.

13. The optical system of claim 12, further comprising:
a polarizer in the light path between the polarization dependent mirror and the display.

14. The optical system of claim 11, further comprising:
a polarizer in the light path between the polarization dependent mirror and the display.

15. The optical system of claim 11, wherein the airspace is located between the mirror and the wave plate.

\* \* \* \* \*